Patented Sept. 20, 1932

1,878,483

UNITED STATES PATENT OFFICE

MAX FORRER, OF PARIS, FRANCE, ASSIGNOR, BY MESNE ASSIGNMENTS, TO AMERICAN ANODE INC., A CORPORATION OF DELAWARE

METHOD FOR THE PRODUCTION OF DEPOSITS FROM AQUEOUS DISPERSIONS OF RUBBER AND RUBBER-LIKE SUBSTANCES

No Drawing. Application filed May 19, 1928, Serial No. 279,213, and in Germany May 27, 1927.

It is known that deposits may be produced from aqueous dispersions of rubber and rubber-like substances by allowing coagulating substances to diffuse from the depositing base or stratum into the rubber dispersion, causing the coagulation of rubber on the depositing base and permitting the production in a shorter time of a thicker deposit than is possible by simple dipping. The migration of the coagulating substance through the coagulated rubber layer is however relatively slow. Hence the outer layers are not sufficiently coagulated when the layers adjacent to the depositing base are already strongly coagulated. Owing to this circumstance the drawback may arise, that the outermost layers of the deposit are not smoothly coagulated but only more or less flocculated.

According to this invention this drawback is eliminated by causing the gelation or solidification of the dispersion medium (instead of a mere agglomeration of the dispersed particles) by changing the temperature of the dispersion. The change of temperature required for the formation of the gel is effected through the depositing base so that at this latter a layer of gel incorporating the dispersed phase of the dispersion will be formed.

The most convenient means of causing the gelation of the dispersion through the influence of temperature changes is by adding thereto a colloid which is sensitive to temperature changes and itself forms a gel when heated or cooled. For example if it is chosen to gel by cooling, gelatine, agar-agar or other similar colloids may be added to the dispersion, while, if it is preferred to gel the liquid by heating, an albumin such as white of egg or blood albumin may be employed. However, the invention is not limited to such means, for the change in temperature may be caused to effect the solidification of the aqueous dispersion medium by means of other agencies.

One of the advantages of the new method is that the solidification caused by change of temperature can proceed through the formed deposit in spite of the formation of gel without substantial hindrance, which is not the case with coagulation caused by chemical coagulants. Hence, if a sufficient temperature difference is maintained, a deposit of any desired thickness can be obtained within a relatively short time. The gel-formation is a complete one up to the outermost layer so that the deposit has a completely smooth and uniformly solidified exterior surface. The gelled dispersion medium carries with it the dispersed rubber and other particles and incorporates them in the deposit as it is formed.

Simultaneously with the deposition through gel-formation a chemical coagulation of the rubber may be caused to take place by permitting coagulating substances to diffuse into and through the rubber deposit. The diffusion can be promoted by electrical means, if the depositing base is employed as an electrode or as a diaphragm in an electric circuit passing through the dispersion.

The combination of these means has the effect that the gel formed by the change of temperature imparts to the rubber deposit a preliminary solidity, while the chemical means causes during the period of gel-formation only a more or less partial coagulation. The immediate complete chemical coagulation or agglomeration of the rubber particles is however important, as the gel imparts to the deposit a sufficient solidity. The osmotic penetration of the gel-deposit by the coagulating substance and the chemical coagulation of the rubber caused thereby may now proceed successively after the formation of the deposit has been completed. This combination of gelation of the aqueous dispersion medium and chemical agglomeration of the dispersed particles is especially advantageous if the gel-formation is caused by cooling. It will be understood that when the gelation is brought about by cooling unaccompanied by chemical coagulation or agglomeration, the deposit should be dried at such a low temperature that the gel does not reliquefy. If, however, the deposit has been kept at a low temperature for a sufficient time to allow the agglomeration of the particles to proceed far enough, the temperature can be raised without the danger of the deposit flowing. In such a manner the drying of the deposit can be effected in a substantially shorter time than without simultaneous chemical coagulation.

The method can be used with natural rubber latex or any natural latex of similar substances, as for example guttapercha or balata, or artificial dispersions of rubber or rubber like substance, such as reclaimed or waste rubber or artificial resins, or mixtures of the above dispersions whether concentrated or not or mixed with compounding substances, such as fillers, dyes, softeners, vulcanizing substances, accelerators and the like. The dispersions may or may not be vulcanized. The deposit may be shaped by immersing a heated or cooled form in the dispersion until the temperature difference has caused the deposit to attain the desired thickness, or by filling a hollow form with the dispersion, or by spreading or spraying the dispersion on the surface of a form, or by extruding the dispersion through a nozzle at such a rate that the dispersion attains the temperature of the nozzle and gels, retaining the shape of the nozzle. The change of temperature can be effected by previous cooling or heating as the case may be of the depositing bases if these have a sufficient heat capacity, or by circulating a cooling or heating medium through the depositing forms or bases during deposition. In case the rubber is deposited on heated metallic forms, electric heating may be found to be most convenient.

In order that gelation may be accomplished without the addition of large amounts of gel-forming substances, it is advisable to remove from the dispersion to be worked up all substances, which could impede the gel-formation. Acids and alkaline substances, for example, which would cause at higher temperature hydrolysis of certain gel-forming substances, ought to be removed or combined chemically. Such substances may be removed by dialysis or, if volatile, by heating or aeration, or may be neutralized by combination with a substance of opposite chemical reaction.

On the other hand the gel-formation can be promoted by suitable additions. When gelatinous substances are added to assist in the gel-formation, an addition of sulphates, acetates, tartrates or sugar-like substances may be useful. As some of the gel-forming colloids such as gelatine and albumin readily putrefy, it may be advisable to add disinfectants to the dispersion.

After the deposit has been removed from the dispersion, it may be treated with coagulating liquids, vapours or gases, for example by dipping into a solution of calcium chloride or acetic acid. This coagulation treatment, after the formation of the deposit, is particularly useful to prevent liquefaction of the deposit when it is formed by a reversible gelation.

Before the deposit is dried the gel-forming colloids which may be contained in the deposit may be rendered insoluble by an appropriate chemical treatment. When gelatin is added to the dispersion the deposits can be treated with tanning agents, for example with a solution or with vapors of formaldehyde.

The formation of the deposit can be effected either in one operation or in several stages, either with the same method or with different methods of deposition. For example the first layers can be produced by spraying and the deposition can be continued by dipping or vice versa. After each stage the layer last deposited may be agglomerated by suitable treatment with coagulating liquids, vapors or gases.

The deposit may be formed as a permanent coating or may be stripped off of the depositing base before or after vulcanization.

Examples:

*Example 1*

To 1000 cm$^3$ of a natural rubber latex containing approximately 38% dry substance composed of 28% rubber and 10% different solid compounding substances are added 200 cm$^3$ of a 20% gelatine solution. The mixture is liquid at room temperature. When a metal mould cooled to 0° C. is dipped into said mixture a solid deposit is formed within 5 minutes having a thickness of 0.6 mm. after drying. The deposit is dried in air at a temperature below 20° C. for an hour, and thereafter is dried for 2 hours at a temperature of 45° C. in a drying chamber. The deposit may be removed from the mould for further manipulation.

*Example 2*

A hollow porous form is impregnated with a 10% solution of zinc sulphate, filled with ice water, and dipped for 5 minutes into the rubber mixture referred to in Example 1. A deposit having a thickness of 1.5 mm. after drying is formed. The ice water is removed and the form is dried in a drying chamber at temperature of 45° C. during 2 hours. The deposit may be removed from the mould for further manipulation.

*Example 3*

A rubber latex concentrated up to 45% rubber content is mixed with an aqueous solution of white of egg in order to add 5 g. dry albumen to 100 g. dry rubber. When a form heated to 90° is immersed in the treated latex a completely coagulated deposit of 8-10 mm. thickness is produced within 5 minutes.

Having now particularly described and ascertained the nature of my said invention and in what manner the same is to be performed, I declare that what I claim is:

1. The method of producing a deposit of rubber from an aqueous dispersion thereof on a form which comprises causing a substantial change in temperature to progress from the surface of the form through the dispersion and effect the solidification of the aqueous dispersion medium.

2. The method of producing rubber articles which comprises immersing a form in an aqueous dispersion of rubber, causing a substantial change in temperature to progress from the surface of the form through the dispersion and effect the solidification of the aqueous dispersion medium, and drying the deposited rubber without permitting it to lose its solidity.

3. The method of producing a deposit of rubber from an aqueous dispersion thereof which comprises adding to the said aqueous dispersion a substance which under the influence of a change in temperature will cause the solidification of the aqueous dispersion medium, immersing a form in the treated dispersion, and causing a substantial change in temperature to progress from the surface of the form through the dispersion, whereby a layer of the aqueous dispersion medium is congealed on the form.

4. The method of producing a deposit of rubber from an aqueous dispersion thereof which comprises adding to the said dispersion a water-soluble colloid capable of gelling when subjecting to a change of temperature, immersing a form in the treated dispersion, and causing a substantial change in temperature to progress from the surface of the form through the dispersion, whereby a layer of the aqueous dispersion medium is congealed on the form.

5. The method of producing a deposit of rubber which comprises adding a heat-coagulable protein to an aqueous rubber dispersion, and immersing a heated form in the said treated dispersion.

6. The method of producing a deposit of rubber which comprises adding egg albumin to an aqueous rubber dispersion and immersing a heated form therein.

7. The method of producing a deposit of rubber which comprises adding to an aqueous rubber dispersion a colloid capable of gelation when subjected to a change of temperature, immersing a form in the said treated dispersion, causing a substantial change in temperature to progress from the surface of the form through the dispersion and effect the solidification of a layer of its aqueous dispersion medium on the form, and drying the deposit without permitting it to become fluid again.

8. The method of producing a deposit of rubber which comprises adding to an aqueous dispersion of rubber a water soluble colloid capable of gelation when subjected to a change of temperature, immersing a form in the treated dispersion, causing a substantial change in temperature to progress from the surface of the form through the dispersion and effect the solidification of a layer of the aqueous dispersion medium on the form, treating the deposit on the form with a reagent adapted to toughen the deposit and render it permanently insoluble, and drying the deposit.

9. The method of producing a deposit of rubber which comprises immersing a form in an aqueous rubber dispersion, causing a substantial change in temperature to progress from the surface of the form through the dispersion and effect the solidification of the aqueous dispersion medium, and simultaneously permitting the migration of coagulating ions through the deposit.

10. The method of producing a deposit of rubber which comprises adding to an aqueous rubber dispersion a gel-forming colloid, chemically treating the dispersion to increase its gel-forming capacity, immersing a form therein, and causing a substantial change in temperature to progress from the surface of the form through the dispersion and effect the gelation of the said colloid.

In testimony whereof I affix my signature.

MAX FORRER.

CERTIFICATE OF CORRECTION.

Patent No. 1,878,483.  September 20, 1932.

MAX FORRER.

It is hereby certified that error appears in the printed specification of the above numbered patent requiring correction as follows: Page 1, line 83, after "however" insert the word "not"; page 2, line 121, after "at" insert "a"; and line 130, before "is" insert "C"; page 3, line 40, claim 4, for "subjecting" read "subjected"; and line 65, claim 7, for "its" read "the"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)